US011187284B2

(12) United States Patent
Burke (10) Patent No.: US 11,187,284 B2
(45) Date of Patent: Nov. 30, 2021

(54) SWITCHABLE RATCHETING CLUTCH WITH TIPPING PAWLS

(71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 110 days.

(21) Appl. No.: 16/671,467

(22) Filed: Nov. 1, 2019

(65) Prior Publication Data

US 2021/0131507 A1 May 6, 2021

(51) Int. Cl.
*F16D 41/16* (2006.01)

(52) U.S. Cl.
CPC .................... *F16D 41/16* (2013.01)

(58) Field of Classification Search
CPC .............. F16D 41/14; F16D 41/16
USPC ........................................ 192/43.1
See application file for complete search history.

(56) References Cited

U.S. PATENT DOCUMENTS

| 2,772,576 A * | 12/1956 | Ross ............... A01K 89/015 74/337 |
| 8,042,670 B2 * | 10/2011 | Bartos ................. F16D 41/16 192/43.1 |
| 9,097,299 B2 * | 8/2015 | Sharp .................. F16D 41/12 |
| 2018/0154772 A1 | 6/2018 | Blair et al. |
| 2018/0274604 A1 | 9/2018 | Ince |
| 2019/0063513 A1 | 2/2019 | Peglowski et al. |

FOREIGN PATENT DOCUMENTS

| GB | 104447 A * | 3/1917 | ............. F16D 41/14 |
| JP | 2016132278 A | 7/2016 | |

* cited by examiner

*Primary Examiner* — Richard M Lorence (57) ABSTRACT

A clutch including: an inner race forming a pocket; an outer race located radially outward of the inner race; a pawl including a portion disposed in the pocket; a cage rotatable by an actuator to a circumferential position with respect to the pawl; and a resilient element fixed to the cage and in contact with the pawl. The inner or outer race is supported for rotation about an axis of rotation. In a first one-way mode: the cage is in the circumferential position; the inner race is relatively rotatable, with respect to the outer race, only in a first circumferential direction; and the resilient element urges the pawl into contact with the outer race. In a second one-way mode: the inner race is relatively rotatable, with respect to the outer race, only in a second circumferential direction; and the resilient element urges the pawl into contact with the outer race.

19 Claims, 11 Drawing Sheets

SWITCHABLE RATCHETING CLUTCH WITH TIPPING PAWLS

TECHNICAL FIELD

The present disclosure relates to a ratcheting clutch using same sets of pawls and resilient element to switch among three operating modes.

BACKGROUND

Known ratcheting clutches generally have a single engaging side and provide ratcheting (free-wheel) function in only one circumferential direction. Known ratcheting clutches designed to provide ratcheting in two circumferential directions require separate ratcheting elements, for example different pawls, for each circumferential direction, increasing the size, inertia, complexity, and cost of the clutch.

SUMMARY

According to aspects illustrated herein, there is provided a switchable ratcheting clutch, including: an inner race forming a pocket; an outer race located radially outward of the inner race; a pawl including a portion disposed in the pocket; a cage rotatable by an actuator to a first circumferential position with respect to the pawl; and a resilient element fixed to the cage and in contact with the pawl. One of the inner race or the outer race is supported for rotation about an axis of rotation. In a first one-way mode of the switchable ratcheting clutch: the cage is in the first circumferential position; the inner race is relatively rotatable, with respect to the outer race, only in a first circumferential direction; and the resilient element urges the pawl into contact with the outer race. In a second one-way mode of the switchable ratcheting clutch: the inner race is relatively rotatable, with respect to the outer race, only in a second circumferential direction, opposite the first circumferential direction; and the resilient element urges the pawl into contact with the outer race.

According to aspects illustrated herein, there is provided a switchable ratcheting clutch, including: an inner race forming a pocket; an outer race located radially outward of the inner race; a pawl including a portion disposed in the pocket, a first protrusion extending from the portion in a first circumferential direction, and a second protrusion extending from the portion in a second circumferential direction, opposite the first circumferential direction; a cage; and a resilient element fixed to the cage and in contact with the pawl. One of the inner race or the outer race is supported for rotation about an axis of rotation. In a first one-way mode of the switchable ratcheting clutch, the inner race is relatively rotatable, with respect to the outer race, only in a first circumferential direction and the resilient element urges the second protrusion into contact with the outer race. In a second one-way mode of the switchable ratcheting clutch, the inner race is relatively rotatable, with respect to the outer race, only in the second circumferential direction and the resilient element urges the first protrusion into contact with the outer race. To transition between the first one-way mode and the second one-way mode, the cage is arranged to be circumferentially displaced, by an actuator, to slide the resilient element along the pawl.

According to aspects illustrated herein, there is provided a method of operating a switchable ratcheting clutch including an inner race forming a pocket, an outer race, a pawl including a portion disposed in the pocket, a cage, and a resilient element directly connected to the cage, the method including: while in a first one-way mode of the switchable ratcheting clutch, rotating, with an actuator and with respect to the inner race, the cage in the first circumferential direction around an axis of rotation around which the inner race or the outer race is supported for rotation; tipping, with the resilient element, a first protrusion of the pawl radially outwardly and into contact with the outer race; switching the switchable ratcheting clutch to a second one-way mode of the switchable ratcheting clutch; rotating the inner race, relative to the outer race, in the first circumferential direction; blocking, with the pawl, relative rotation of the inner race, with respect to the outer race, in a second circumferential direction, opposite the first circumferential direction; rotating, with the actuator and with respect to the inner race, the cage in the second circumferential direction; tipping, with the resilient element, a second protrusion of the pawl radially outwardly and into contact with the outer race; switching the switchable ratcheting clutch to the first one-way mode; rotating the inner race, relative to the outer race, in the second circumferential direction; and blocking, with the pawl, relative rotation of the inner race, with respect to the outer race, in the first circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
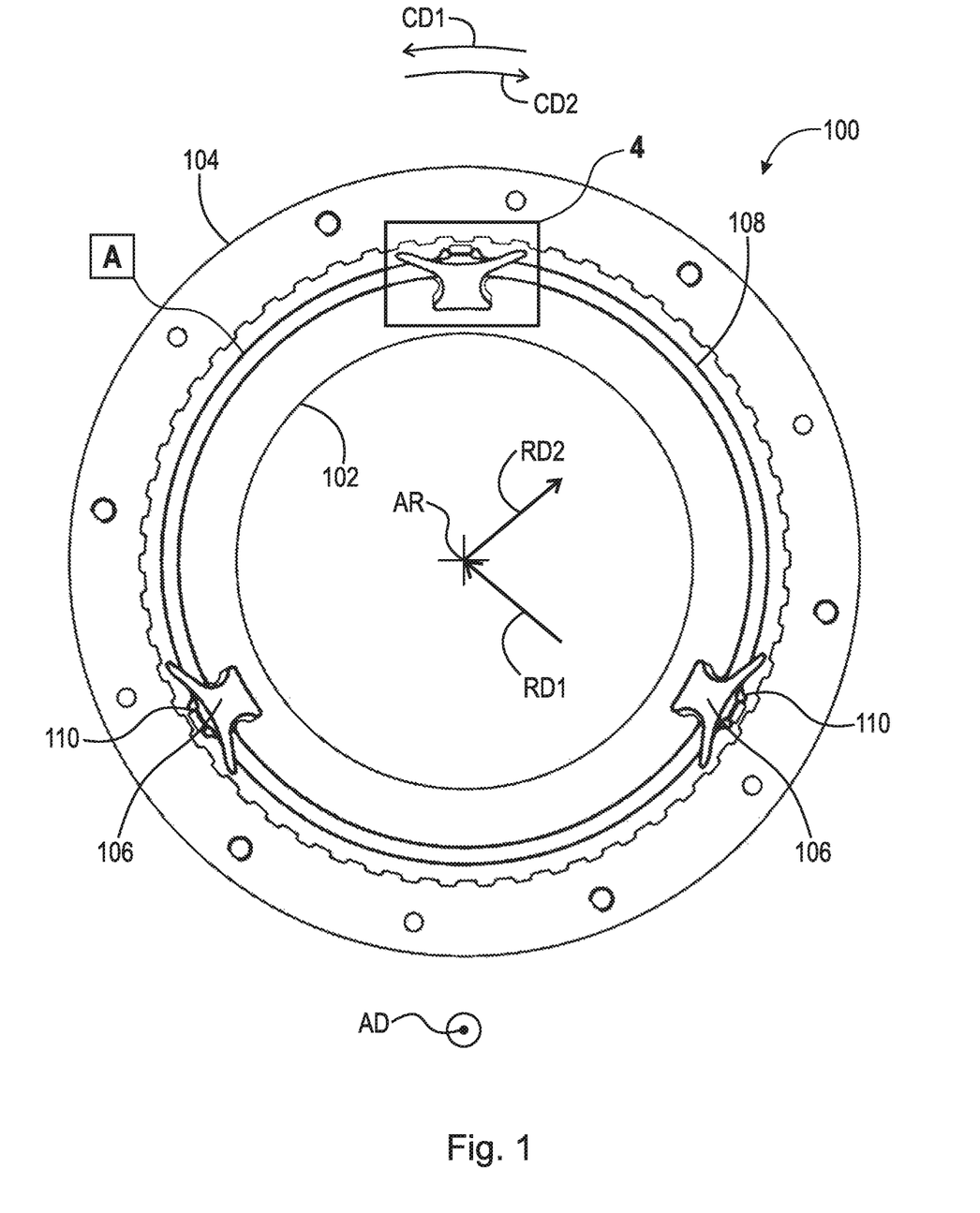
FIG. 1 is a front view of a switchable ratcheting clutch with tipping pawls in a free-wheel mode.

FIG. 1 is a front view of switchable ratcheting clutch 100 with tipping pawls in a free-wheel mode.

Figure 2:
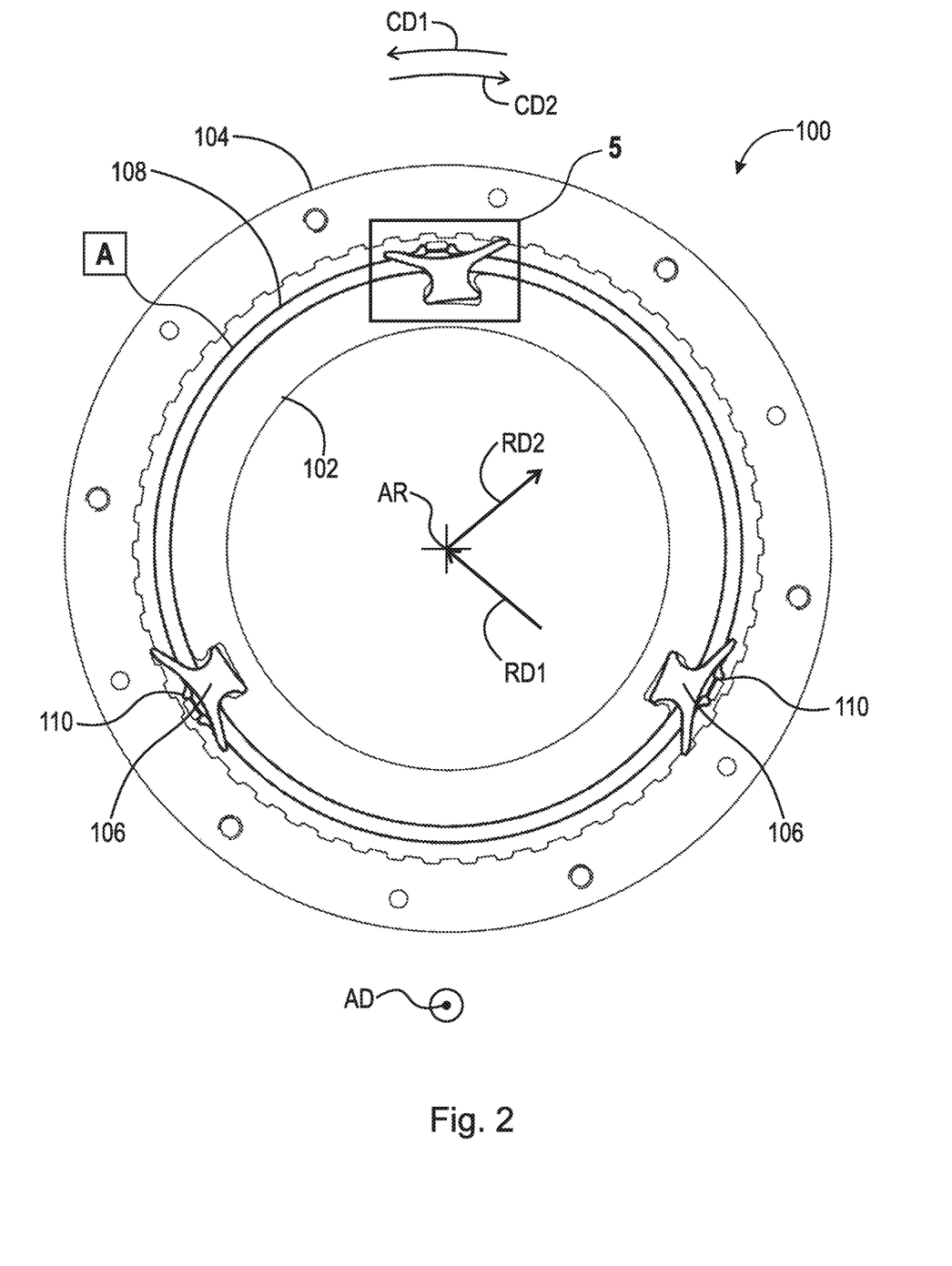
FIG. 2 is a front view of the switchable ratcheting clutch shown in FIG. 1 in a first one-way mode.

FIG. 2 is a front view of switchable ratcheting clutch 100 shown in FIG. 1 in a first one-way mode.

Figure 3:
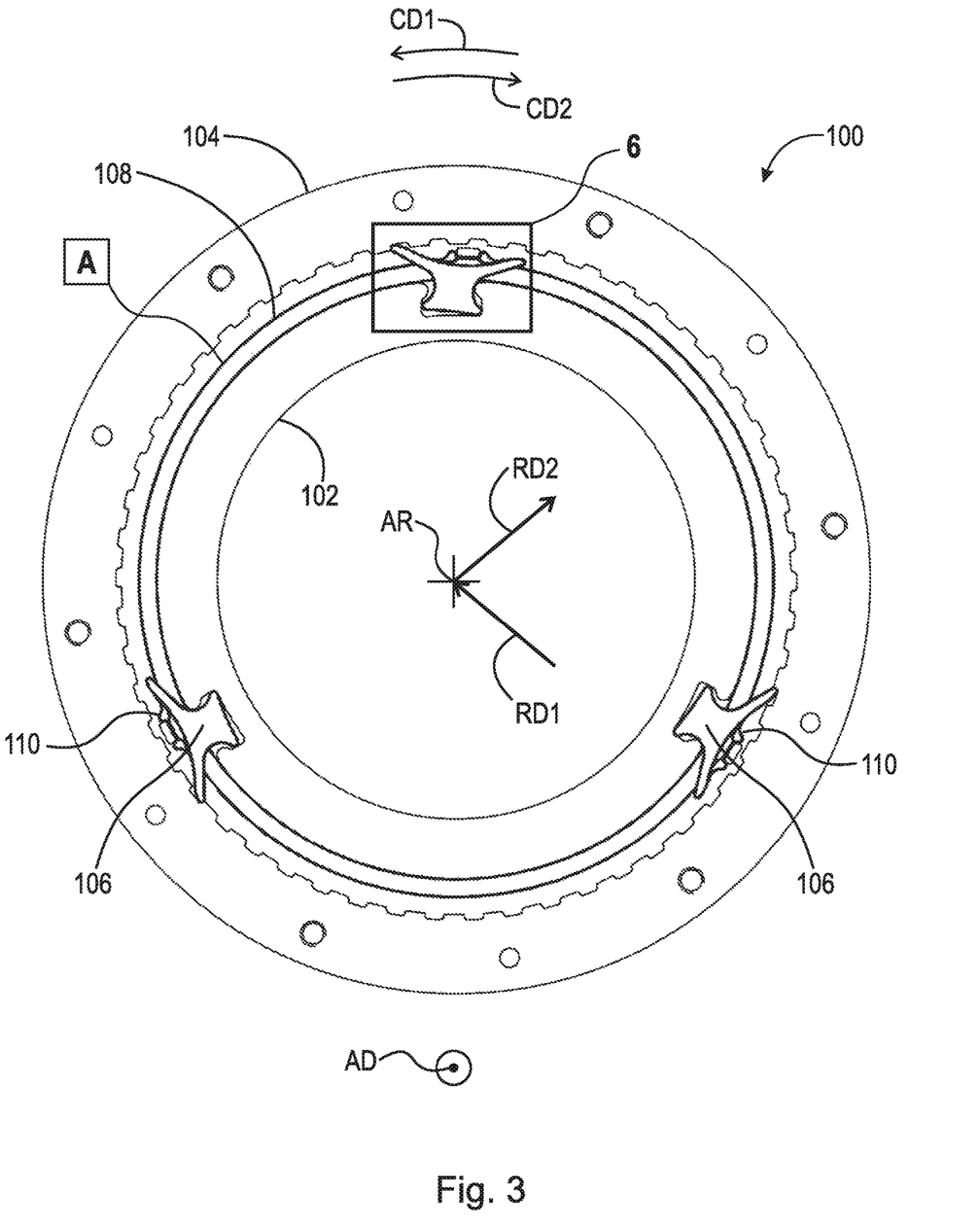
FIG. 3 is a front view of the switchable ratcheting clutch shown in FIG. 1 in a second one-way mode.

FIG. 3 is a front view of switchable ratcheting clutch 100 shown in FIG. 1 in a second one-way mode. The following should be viewed in light of FIGS. 1 through 3. Switchable ratcheting clutch 100 includes: inner race 102; outer race 104; pawls 106; cage 108; and resilient elements 110. Race 102 and race 104 are radially off-set from each other. Resilient elements 110 are directly connected to cage 108 and engaged with, for example in contact with, pawls 106. One of inner race 102 or outer race 104 is: supported for rotation about axis of rotation AR; and arranged to receive rotational torque.

In the free-wheel mode of clutch 100: resilient elements 110 are arranged to urge pawls 106 out of contact with outer race 104. In the free-wheel mode, relative rotation of inner race 102, with respect to outer race 104, is enabled in opposite circumferential directions CD1 and CD2. Circumferential directions CD1 and CD2 are defined with respect to axis AR. In an example embodiment, cage 108 is circumferentially continuous in directions CD1 and CD2. That is, cage 108 is unbroken in directions CD1 and CD2

In the first one-way mode of clutch 100: resilient elements 110 are arranged to tip pawls 106 into contact with outer race 104; relative rotation of inner race 102, with respect to outer race 104, is enabled only in circumferential direction CD1; and relative rotation of inner race 102, with respect to outer race 104, is precluded, or blocked, in circumferential direction CD2. In the second one-way mode of clutch 100: resilient elements 110 are arranged to tip pawls 106 into contact with outer race 104; relative rotation of inner race 102, with respect to outer race 104, is enabled only in circumferential direction CD2; and relative rotation of inner race 102, with respect to outer race 104, is precluded, or blocked, in circumferential direction CD1.

By "relative rotation of inner race 102, with respect to outer race 104" in a circumferential direction, for example direction CD1, we mean the following: both race 102 and race 104 are rotating in circumferential direction CD1 and race 102 is rotating faster than race 104 in circumferential direction CD1; race 104 is rotational fixed (grounded) and race 102 is rotating in circumferential direction CD1; or race 102 is rotationally fixed (grounded) and race 104 is rotating in circumferential direction CD2.

Figure 4:
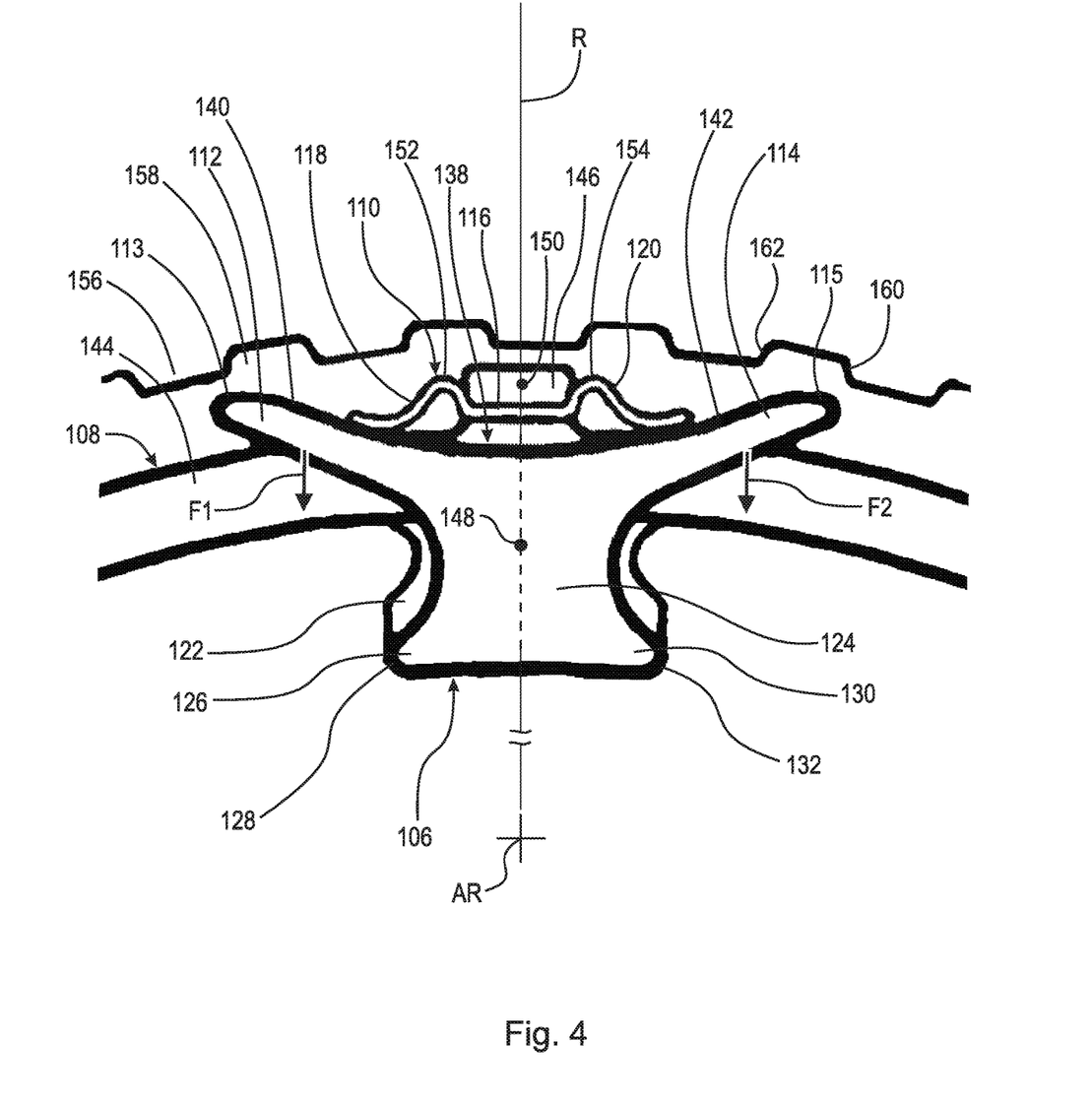
FIG. 4 is a detail of area 4 in FIG. 1.

FIG. 4 is a detail of area 4 in FIG. 1.

Figure 5:
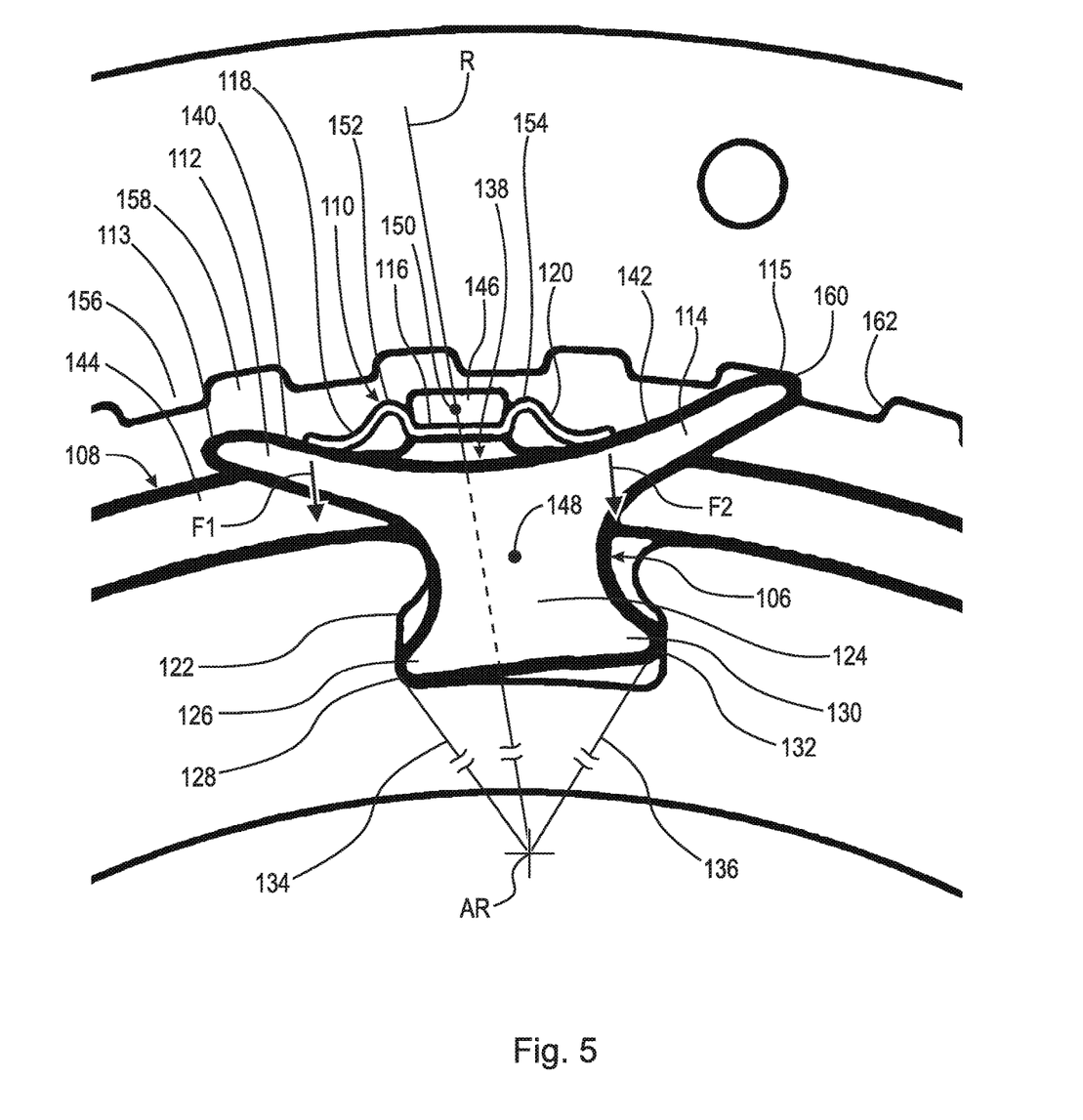
FIG. 5 is a detail of area 5 in FIG. 2.

FIG. 5 is a detail of area 5 in FIG. 2.

Figure 6:
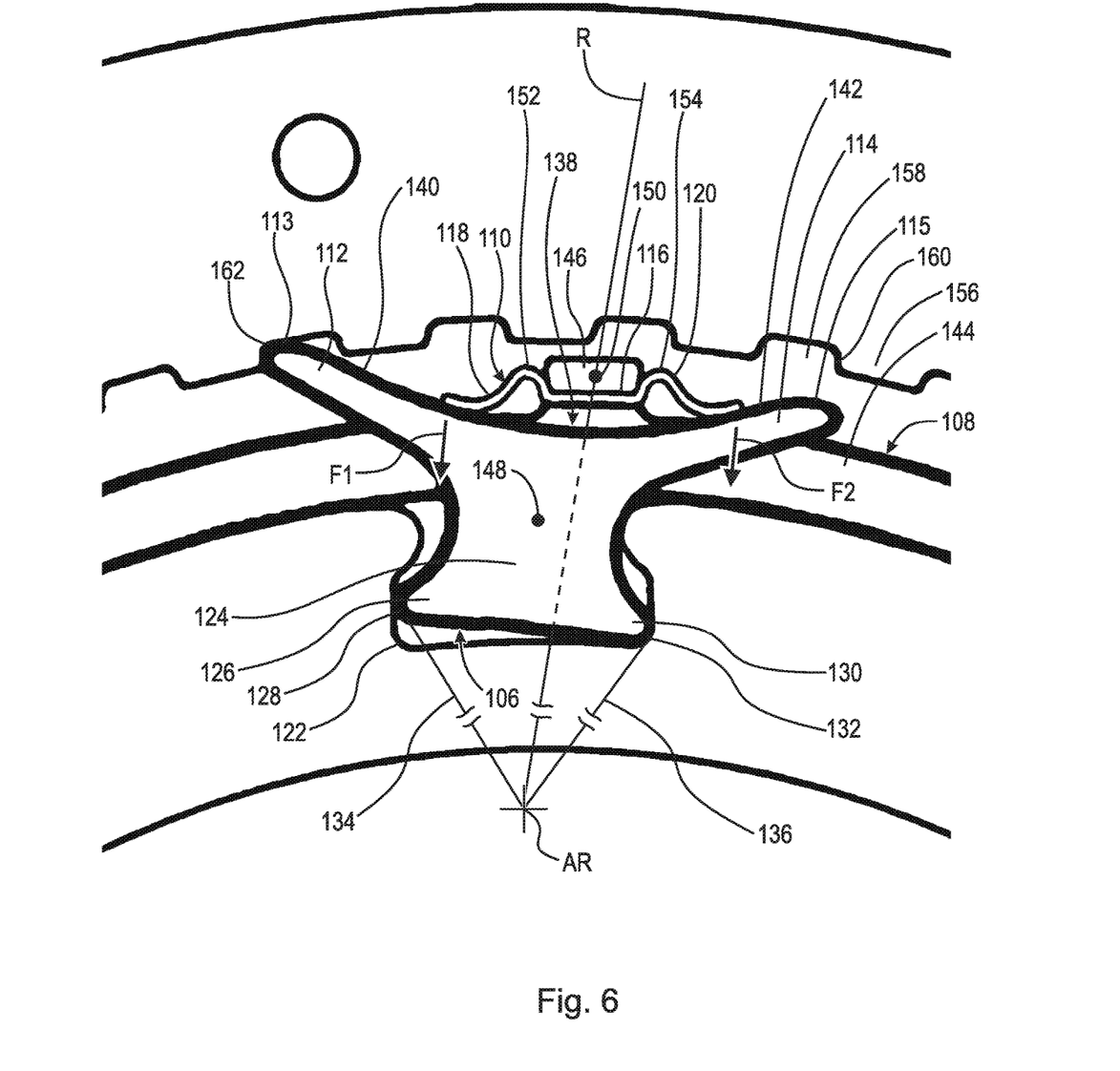
FIG. 6 is a detail of area 6 in FIG. 3.

FIG. 6 is a detail of area 6 in FIG. 3. The following should be viewed in light of FIGS. 1 through 6. To switch clutch 100 from the first one-way mode to the second one-way mode, cage 108 is arranged to be displaced, by actuator A and with respect to inner race 102, in circumferential direction CD2. To switch clutch 100 from the second one-way mode to the first one-way mode, cage 108 is arranged to be displaced, by actuator A and with respect to inner race 102, in circumferential direction CD1. Actuator A is schematically represented in FIGS. 1 through 3. Actuator A can be any actuator known in the art. In an example embodiment, clutch 100 includes actuator A.

To switch clutch 100 from the first one-way mode to the second one-way mode, resilient elements 110 are arranged to tip pawls 106 radially inwardly in radially inward direction RD1. To switch from the second one-way mode to the first one-way mode, resilient elements 110 are arranged to tip pawls 106 radially inwardly in direction RD1.

Each pawl 106 includes: protrusion, or portion, 112 radially outward of inner race 102, extending in circumferential direction CD1, and including distal end 113; and circumferential protrusion, or portion, 114 radially outward of inner race 102, extending in circumferential direction CD2, and including distal end 115. Protrusion 112 and distal end 113 form a portion of the pawl 106 radially outward of inner race 102 and extending furthest in direction CD1. Protrusion 114 and distal end 115 form a portion of the pawl 106 radially outward of inner race 102 and extending furthest in direction CD2.

To switch from the first one-way mode to the second one-way mode, resilient elements 110 are arranged to tip pawls 106, for example protrusions 114, radially inwardly in direction RD1. To switch from the second one-way mode to the first one-way mode, resilient elements 110 are arranged to tip pawls 106, for example protrusions 112, radially inwardly in direction RD1. In the first one-way mode, protrusions 114 are in contact with outer race 104. In the second one-way mode, protrusions 112 are in contact with outer race 104.

Each resilient element 110 includes middle portion 116 directly connected to cage 108, for example, middle portion 116 is in contact with cage 108 and fixed to cage 108. Each resilient element 110 includes: portion 118 extending from middle portion 116 in circumferential direction CD1 and directly connected to a respective protrusion 112, for example in contact with the protrusion 112; and portion 120 extending from middle portion 116 in circumferential direction CD2 and directly connected to a respective protrusion 114, for example in contact with the protrusion 114.

Resilient elements 110: urge protrusions 112 radially inwardly in direction RD1 with force F1; and urge protrusions 114 radially inwardly in direction RD1 with force F2. To switch from the first one-way mode to the second one-way mode, cage 108 is arranged to be displaced, by actuator A and with respect to inner race 102, in circumferential direction CD2 to: slide resilient elements 110 along pawls 106; increase forces F2; and decrease forces F1.

To switch from the second one-way mode to the first one-way mode, cage 108 is arranged to be displaced, by actuator A and with respect to inner race 102, in circumferential direction CD1 to: slide resilient elements 110 along pawls 106; increase forces F1; and decrease forces F2. In the free-wheel mode, forces F1 and F2 are substantially balanced so that protrusion 112 and protrusion 114 remain free of contact with outer race 104.

Inner race forms pockets 122. Portions 124 of pawls 106 are disposed in pockets 122. In an example embodiment, portions 124 form irregular shapes in a front view in axial direction AD parallel to axis AR. For example, each portion 124 does not form a single circular disc shape in the front view in axial direction AD1. A front view of portions 124 is seen in FIGS. 1 through 3. In FIG. 1 through 3, direction AD1 is into the sheet.

In an example embodiment, each portion 124 includes: protrusion 126 extending in circumferential direction CD1 and including distal end 128; and protrusion 130 extending in circumferential direction CD2 and including distal end 132. In the first one-way mode, distal end 128 is radially inward of distal end 132 in direction RD1. In the second one-way mode, distal end 132 is radially inward of distal end 128 in direction RD1. For example: end 128 and end 132 are at radial distances 134 and 136, respectively, from axis AR; distance 136 is greater than distance 134 in the first one-way mode shown in FIGS. 2 and 5; and distance 134 is greater than distance 136 in the second one-way mode shown in FIGS. 3 and 6. In an example embodiment, portions 124 are non-rotatable with respect to inner race 102 in directions CD1 and CD2. For example, portions 124 are tippable within respective pockets 122; however, respective centers of gravity 148 do not displace in direction CD1 or CD2 as portions 124 tip.

Each pawl 106 includes radially outwardly facing surface 138. Each surface 138 includes: portion 140 facing at least partly in circumferential direction CD2; and portion 142 facing at least partly in circumferential direction CD1. Portions 118 of resilient elements 110 are directly connected to, for example in contact with, portions 140. Portions 120 of resilient elements 110 are directly connected to, for example in contact with, portions 142.

To switch from the free-wheel mode to the first one-way mode: cage 108 and resilient elements 110 are arranged to be displaced, by actuator A and with respect to inner race 102, in circumferential direction CD1; resilient elements 110 are arranged to tip pawls 106, for example protrusions 112, radially inwardly in direction RD1; and protrusion 114 are arranged to contact outer race 104.

To switch from the free-wheel mode to the second one-way mode: cage 108 and resilient elements 110 are arranged to be displaced, by actuator A and with respect to inner race 102, in circumferential direction CD2; resilient elements 110 are arranged to tip pawls 106, for example protrusions 114, radially inwardly in direction RD1; and protrusions 112 are arranged to contact outer race 104.

Figure 7:
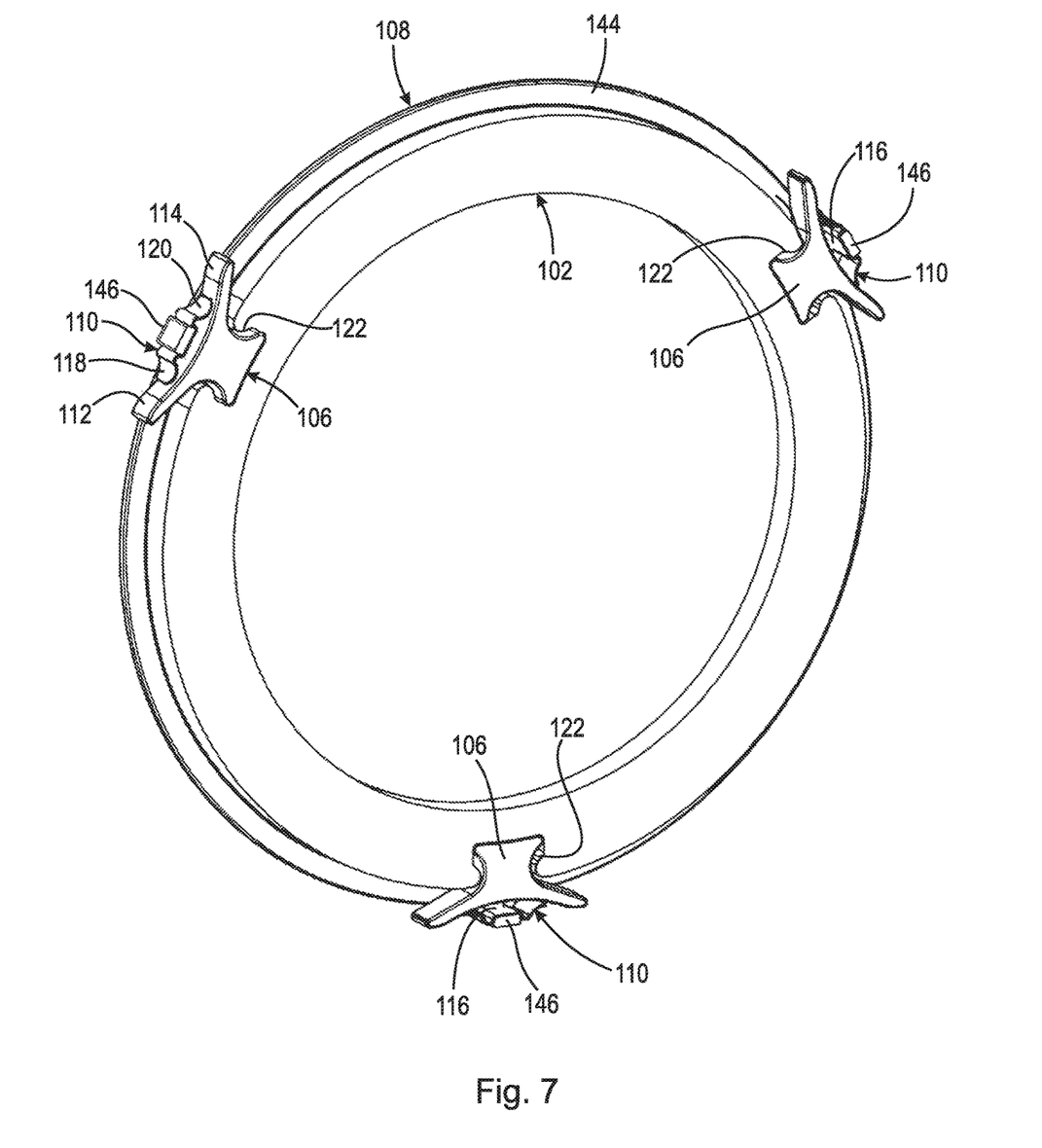
FIG. 7 is an isometric front view of the switchable ratcheting clutch shown in FIG. 1 with an outer race removed.

FIG. 7 is an isometric front view of switchable ratcheting clutch 100 shown in FIG. 1 with outer race 104 removed.

Figure 8:
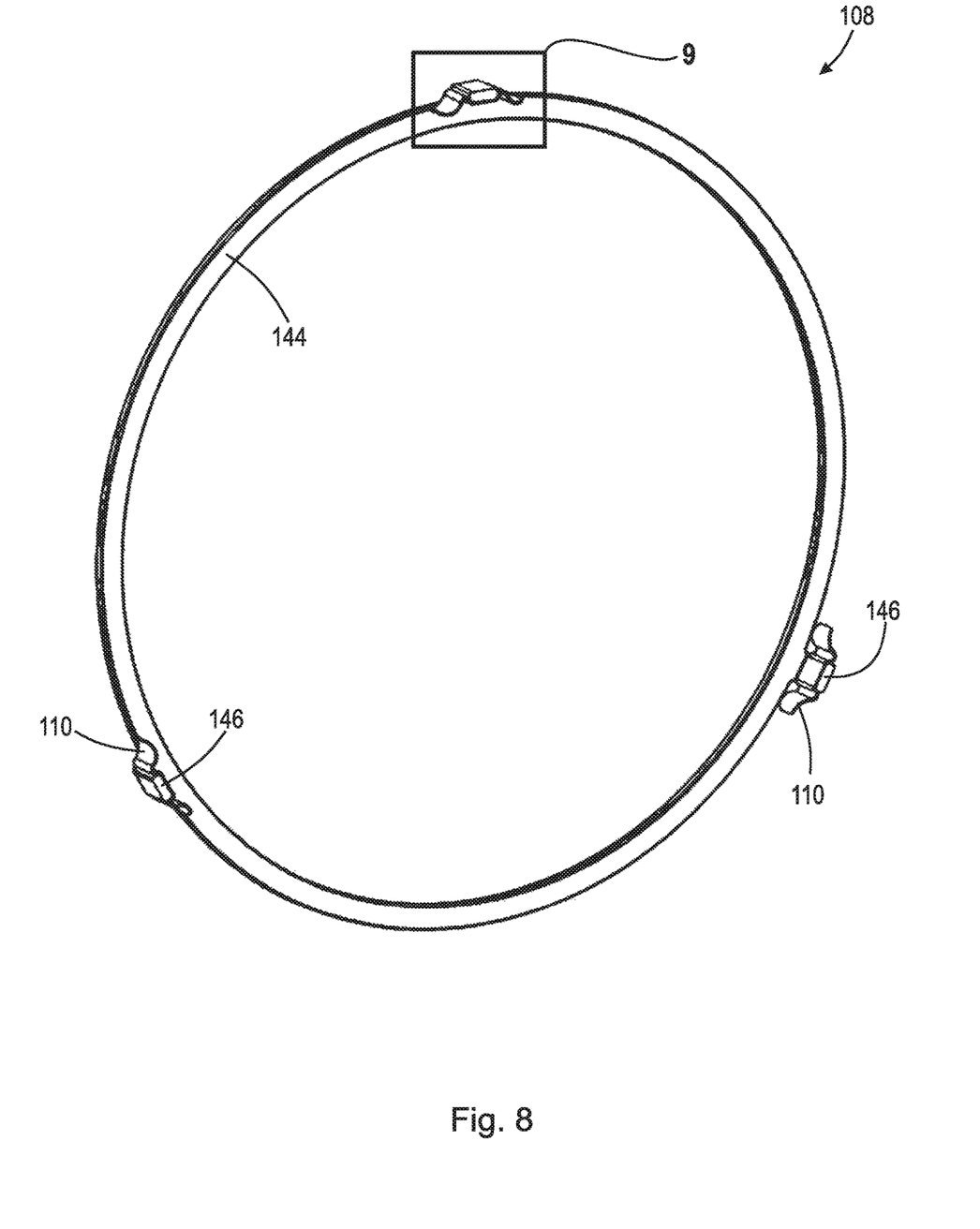
FIG. 8 is an isometric view of a cage and resilient elements shown in FIG. 1.

FIG. 8 is an isometric view of cage 108 and resilient elements 110 shown in FIG. 1.

Figure 9:
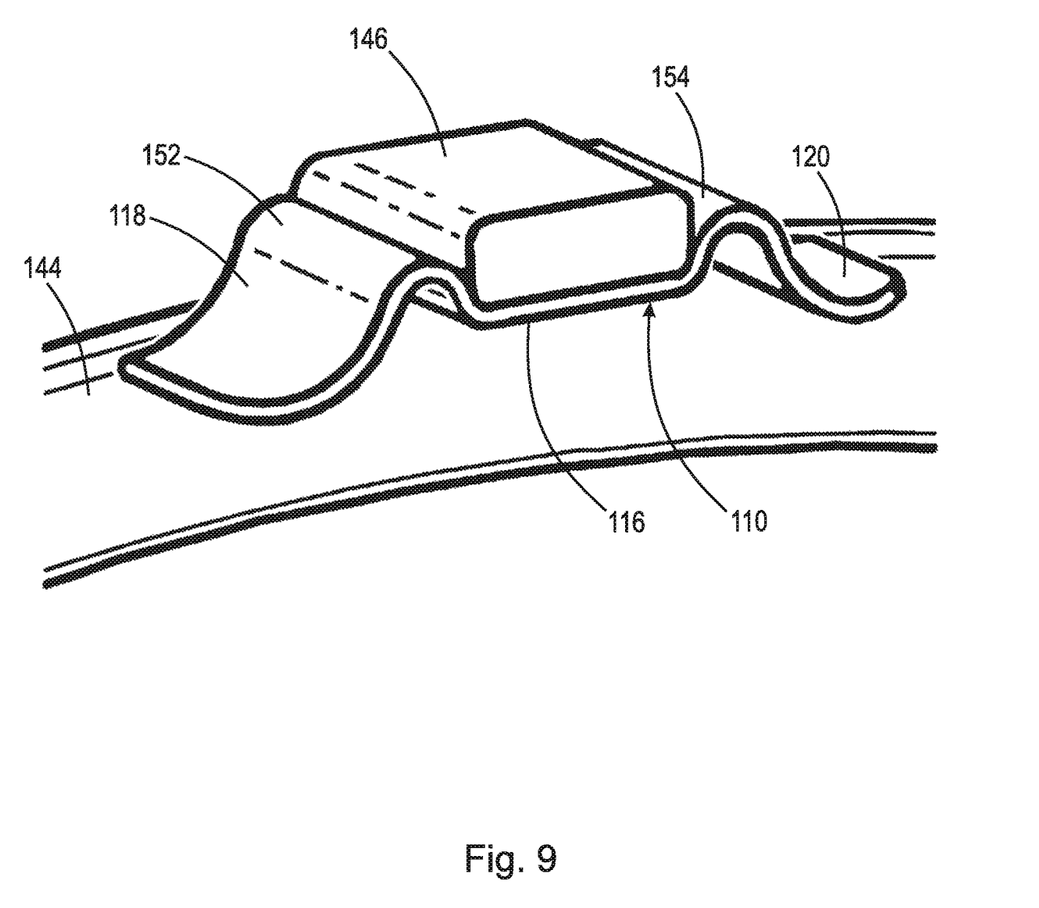
FIG. 9 is a detail of area 9 in FIG. 8.

FIG. 9 is a detail of area 9 in FIG. 8.

Figure 10:
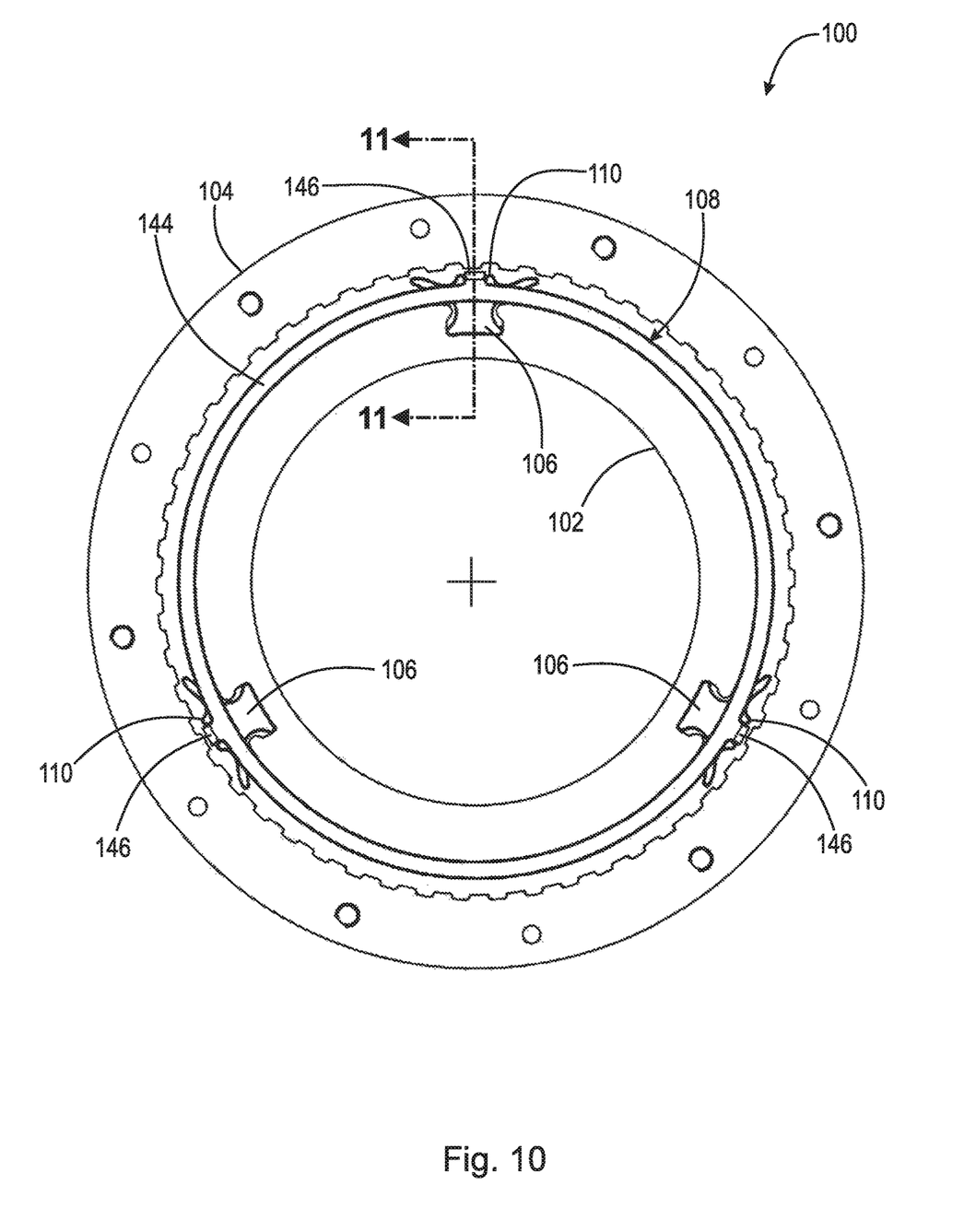
FIG. 10 is a back view of the switchable ratcheting clutch shown in FIG. 1; and, FIG. 11 is a cross-section generally along line 11-11 in FIG. 10.

FIG. 10 is a back view of switchable ratcheting clutch 100 shown in FIG. 1.

Figure 11:
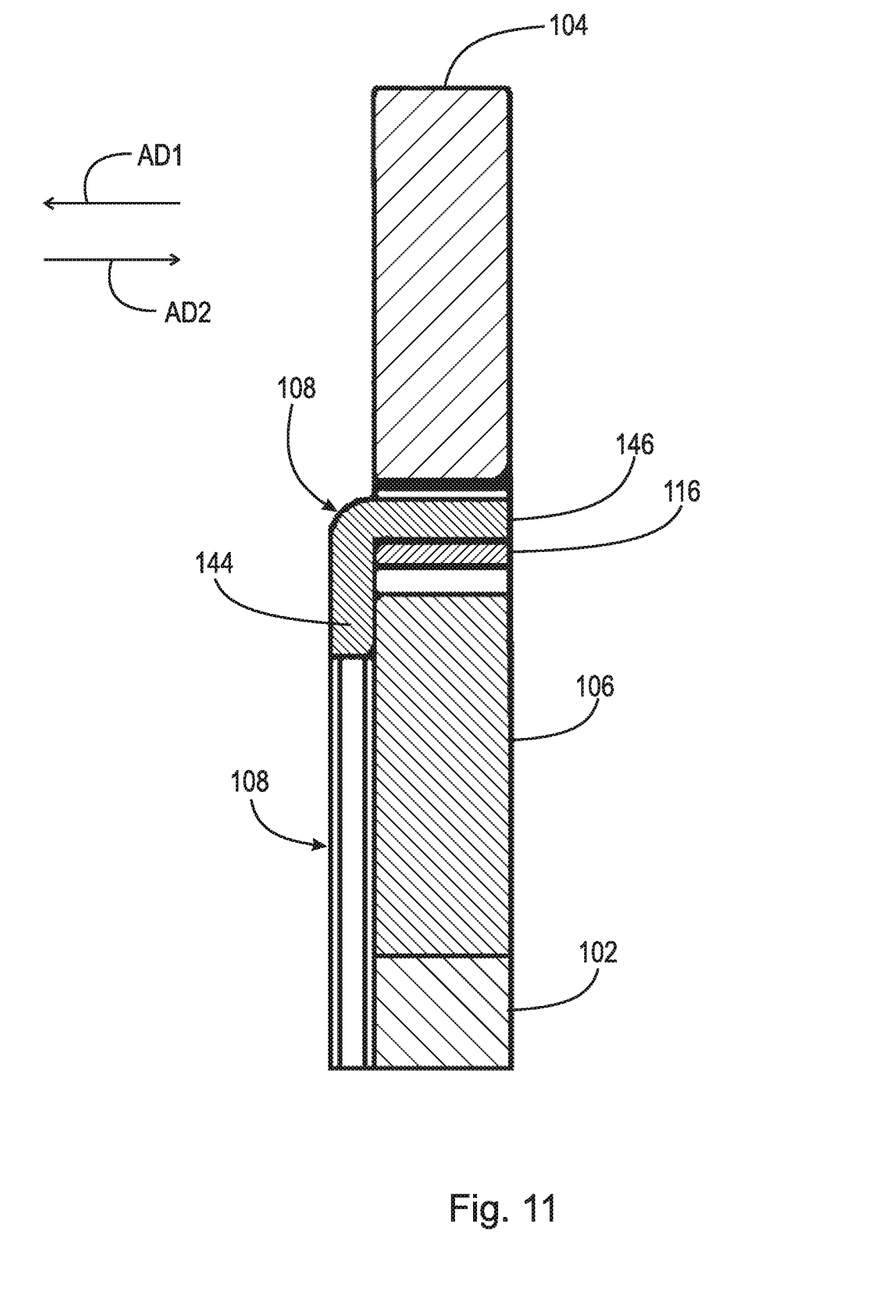

FIG. 11 is a cross-section generally along line 11-11 in FIG. 10. The following should be viewed in light of FIGS. 1 through 11. In an example embodiment, cage 108 includes: circumferentially continuous annular portion 144; and segments 146. Segments 146: extend in axial direction AD2, opposite direction AD1, from portion 144; and are radially disposed between inner race 102 and outer race 104. Resilient elements 110, for example middle portions 116, are directly connected to segments 146. In an example embodiment, portion 144 is in contact with inner race 102. In an example embodiment, portion 144 is axially off-set from inner race 102 and outer race 104 in direction AD1. Pawls 106: are off-set from circumferentially continuous annular portion 144 in axial direction AD2; and overlap circumferentially continuous annular portion 144 in axial direction AD2. Continuous annular portion 144 overlaps pawls 106 in radially outer direction RD2.

Each pawl 106 includes center of gravity 148. Each segment 146 includes center axis 150. Center axis 150: passes through the segment 146; is centered in circumferential directions CD1 and CD2 with respect to the segment 146; and is parallel to axis AR. In an example embodiment: in the free-wheel mode: each pawl 106 and a respective segment 146 are symmetrical around radius R passing from axis of rotation AR through the center of gravity 148 of the pawl 106 and the center axis 150 of the respective segment 146; in the first one-way mode, the respective center axis 150 is off-set from the center of gravity 148 of the pawl 106 in circumferential direction CD1; and in the second one-way mode, the respective center axis 150 is off-set from the center of gravity 148 of the pawl 106 in circumferential direction CD2.

The following should be viewed in light of FIGS. 1 through 11. The following describes a method of operating switchable ratcheting clutch 100. A first step, from the second one-way mode of switchable ratcheting clutch 100, rotates, with actuator A and with respect to inner race 102, cage 108 in circumferential direction CD1 around axis of rotation AR. A second step tips, with a resilient element 110, a protrusion 114 of a pawl 106 radially outwardly and into contact with outer race 104. A third step switches clutch 100 to the first one-way mode of clutch 100. A fourth step rotates inner race 102, relative to outer race 104, in circumferential direction CD1. A fifth step blocks, with the pawl 106, relative rotation of inner race 102, with respect to outer race 104, in circumferential direction CD2.

A sixth step rotates, with actuator A and with respect to inner race 102, cage 108 in circumferential direction CD2. A seventh step tips, with the resilient element 110, protrusion 112 of the pawl 106 radially outwardly and into contact with outer race 104. An eighth step switches clutch 100 to the second one-way mode of clutch 100. A ninth step rotates inner race 102, relative to outer race 104, in circumferential direction CD2. A tenth step blocks, with the pawl 106, relative rotation of inner race 102, with respect to outer race 104, in circumferential direction CD1.

A eleventh step rotates, with actuator A and with respect to inner race 102, cage 108 in circumferential direction CD1. A twelfth step tips, with the resilient element 110, the pawl 106 out of contact with outer race 104. A thirteenth step enables rotation of inner race 102, with respect to outer race 104, in circumferential direction CD1 and in circumferential direction CD2.

A fourteenth step urges, with the resilient element 110: protrusion 114 of the pawl 106 radially inwardly with force F1; and protrusion 112 of the pawl 106 radially inwardly with force F2. Switching clutch 100 to the first one-way mode of clutch 100 includes: sliding the resilient element 110 along pawl 106 in circumferential direction CD1; increasing force F2; and decreasing force F1. Switching switchable ratcheting clutch 100 to the second one-way mode of clutch 100 includes: sliding the resilient element 110 along pawl 106 in circumferential direction CD2; increasing force F1; and decreasing force F2.

In an example embodiment, switching switchable ratcheting clutch 100 to the first one-way mode of clutch 100 includes: tipping distal end 128 of the pawl 106 radially inwardly within a pocket 122; and tipping distal end 132 of the pawl 106 radially outwardly within the pocket 122. In an example embodiment, switching switchable ratcheting clutch 100 to the second one-way mode includes: tipping distal end 128 of the pawl 106 radially outwardly within the pocket 122; and tipping distal end 132 of the pawl 106 radially inwardly within the pocket 212.

The following provides further detail regarding clutch 100 and a method of operating clutch 100. In an example embodiment: portion 118 and portion 120 of each resilient element 110 include shoulders 152 and 154, respectively, which are in compressive contact with a respective segment 146, at least contributing to the fixing of the resilient element 110 to the respective segment 146.

In an example embodiment, outer race 105 includes teeth 156 defining slots 158. Each tooth 156 includes side 160 facing in direction CD1, and side 162 facing in direction CD2. In the first one-way mode: for relative rotation of inner race 102, with respect to outer race 104 in direction CD1, protrusions 114 slide, or ratchet, along teeth 156 without non-rotatably connecting to teeth 156, in particular to sides 162; and, to preclude relative rotation of inner race 102, with respect to outer race 104 in direction CD2, protrusions 114 are disposed in respective slots 158 and in contact with respective sides 160, blocking rotation of inner race 102 with respect to outer race 104 in direction CD2.

In the second one-way mode: for relative rotation of inner race 102, with respect to outer race 104 in direction CD2, protrusions 112 slide, or ratchet, along teeth 156 without non-rotatably connecting to teeth 156, in particular to sides 160; and, to preclude relative rotation of inner race 102, with respect to outer race 104 in direction CD1, protrusions 112 are disposed in respective slots 158 and in contact with respective sides 162 blocking rotation of inner race 102 with respect to outer race 104 in direction CD1.

Switchable ratcheting clutch 100 provides a three-mode clutch solution (the first one-way mode, the second one-way mode, and the free-wheel mode), using the same sets of pawls 106 and resilient elements 110 for each mode. Thus, the same pairs of pawls 106 and resilient elements 110 replace the known use of separate sets of components, for example sets of pawls and resilient elements, for each mode of a ratcheting clutch. As a result, clutch 100 reduces the parts count, complexity, inertia, and production costs for a three-mode ratcheting clutch.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AD axial direction
AD2 axial direction
AR axis of rotation
CD1 circumferential direction
CD2 circumferential direction
F1 force, resilient element
F2 force, resilient element
R radius
RD1 radially inner direction
RD2 radially outer direction
100 switchable ratcheting clutch
102 inner race
104 outer race
106 pawl
108 cage
110 resilient element
112 protrusion, pawl
113 distal end, pawl
114 protrusion, pawl
115 distal end, pawl
116 middle portion, resilient element
118 portion, resilient element
120 portion, resilient element
122 pocket, inner race
124 portion, pawl
126 protrusion, pawl
128 distal end, pawl
130 protrusion, pawl
132 distal end, pawl
134 radial distance
136 radial distance
138 radially outwardly facing surface, pawl
140 portion, surface 136
142 portion, surface 136
144 continuous portion, cage
146 segment, cage
148 center of gravity, pawl
150 center axis, segment 146
152 shoulder, resilient element
154 shoulder, resilient element
156 tooth, outer race
158 slot, outer race
160 side, tooth 156
162 side, tooth 156

The invention claimed is:

1. A switchable ratcheting clutch, comprising:
an inner race forming a pocket;
an outer race located radially outward of the inner race;
a pawl including:
  a portion disposed in the pocket; and,
  a radially outwardly facing surface;
a cage rotatable, by an actuator, to a first circumferential position with respect to the pawl; and,
a resilient element fixed to the cage and in contact with the radially outwardly facing surface of the pawl, wherein:
  one of the inner race or the outer race is supported for rotation about an axis of rotation;
  in a first one-way mode of the switchable ratcheting clutch:
    the cage is in the first circumferential position;
    the inner race is relatively rotatable, with respect to the outer race, only in a first circumferential direction; and,
    the resilient element urges the pawl into contact with the outer race; and,
  in a second one-way mode of the switchable ratcheting clutch:
    the inner race is relatively rotatable, with respect to the outer race, only in a second circumferential direction, opposite the first circumferential direction; and,
    the resilient element urges the pawl into contact with the outer race.

2. The switchable ratcheting clutch of claim 1, wherein the cage is unbroken in the first circumferential direction.

3. The switchable ratcheting clutch of claim 1, wherein:
the cage is rotatable, by the actuator, to a second circumferential position of the cage in the second one-way mode with respect to the pawl.

4. The switchable ratcheting clutch of claim 1, wherein: the pawl includes:
a first protrusion extending in the first circumferential direction; and,
a second protrusion extending in the second circumferential direction;
in the first one-way mode, the second protrusion is in contact with the outer race; and,
in the second one-way mode, the first protrusion is in contact with the outer race.

5. The switchable ratcheting clutch of claim 4, wherein the resilient element includes:
a middle portion directly connected to the cage;
a first end:
  extending from the middle portion in the first circumferential direction and in contact with the first protrusion; and, urging the first protrusion radially inwardly with a first force; and,
a second end:
extending from the middle portion in the second circumferential direction and in contact with the second protrusion; and,
urging the second protrusion radially inwardly with a second force.

6. The switchable ratcheting clutch of claim 5, wherein:
in the first one-way mode, the first force is greater than the second force; and,
in the second one-way mode, the second force is greater than the first force.

7. The switchable ratcheting clutch of claim 1, wherein:
in a free-wheel mode of the switchable ratcheting clutch, the inner race is relatively rotatable, with respect to the outer race, in the first circumferential direction and in the second circumferential direction; and,
the cage is rotatable by the actuator to a second circumferential position of the cage in the free-wheel mode, with respect to the pawl.

8. The switchable ratcheting clutch of claim 1, wherein:
the portion of the pawl includes:
a first protrusion extending in the first circumferential direction; and,
a second protrusion extending in the second circumferential direction;
in the first one-way mode, the first protrusion is radially inward of the second protrusion; and,
in the second one-way mode, the second protrusion is radially inward of the first protrusion.

9. The switchable ratcheting clutch of claim 1, wherein:
the radially outwardly facing surface of the pawl includes:
a first portion facing partly in the first circumferential direction; and,
a second portion facing partly in the second circumferential direction; and,
the resilient element includes:
a first portion in contact with the first portion of the radially outwardly facing surface; and,
a second portion in contact with the second portion of the radially outwardly facing surface.

10. The switchable ratcheting clutch of claim 1, wherein:
the cage includes:
a circumferentially continuous annular portion; and,
a segment extending from the circumferentially continuous annular portion, the segment radially disposed between the inner race and the outer race; and,
the resilient element is directly connected to the segment of the cage.

11. The switchable ratcheting clutch of claim 10, wherein the pawl:
is off-set from the circumferentially continuous annular portion in an axial direction parallel to the axis of rotation; and,
overlaps the circumferentially continuous annular portion in a radial direction.

12. The switchable ratcheting clutch of claim 10, wherein:
a center axis passes through the segment of the cage:
the center axis is centered in the first circumferential direction with respect to the segment of the cage;
the pawl includes a center of gravity;
in the first one-way mode, the center axis is off-set from the center of gravity in the first circumferential direction; and,
in the second one-way mode, the center axis is off-set from the center of gravity in the second circumferential direction.

13. A switchable ratcheting clutch, comprising:
an inner race forming a pocket;
an outer race located radially outward of the inner race;
a pawl including:
a portion disposed in the pocket;
a first protrusion extending in a first circumferential direction; and,
a second protrusion extending in a second circumferential direction, opposite the first circumferential direction;
a cage; and,
a resilient element fixed to the cage and in contact with the pawl, wherein:
one of the inner race or the outer race is supported for rotation about an axis of rotation;
in a first one-way mode of the switchable ratcheting clutch, the inner race is relatively rotatable, with respect to the outer race, only in a first circumferential direction and the resilient element urges the second protrusion into contact with the outer race;
in a second one-way mode of the switchable ratcheting clutch, the inner race is relatively rotatable, with respect to the outer race, only in the second circumferential direction and the resilient element urges the first protrusion into contact with the outer race;
to transition between the first one-way mode and the second one-way mode, the cage is arranged to be circumferentially displaced, by an actuator, to slide the resilient element along the pawl;
the pawl includes a radially outwardly facing surface; and,
to switch between the first one-way mode and the second one-way mode, the cage is arranged to be circumferentially displaced, by the actuator, to slide the resilient element along the radially outwardly facing surface.

14. The switchable ratcheting clutch of claim 13, wherein:
to switch from the first one-way mode to the second one-way mode, the cage is arranged to be displaced, by the actuator and with respect to the inner race, in the second circumferential direction; and,
to switch from the second one-way mode to the first one-way mode, the cage is arranged to be displaced, by the actuator and with respect to the inner race, in the first circumferential direction.

15. The switchable ratcheting clutch of claim 14, wherein the resilient element includes:
a first end urging the first protrusion radially inwardly with a first force; and,
a second end urging the second protrusion radially inwardly with a second force;
to switch from the first one-way mode to the second one-way mode, the cage is arranged to increase the second force; and,
to switch from the second one-way mode to the first one-way mode, the cage is arranged to increase the first force.

16. The switchable ratcheting clutch of claim 13, wherein:
in a free-wheel mode of the switchable ratcheting clutch:
the inner race is relatively rotatable, with respect to the outer race, in the first circumferential direction and in the second circumferential direction; and,
the pawl is free of contact with the outer race;

to switch from the free-wheel mode to the first one-way mode, the cage is arranged to be rotated, by the actuator, in the first circumferential direction; and, to switch from the free-wheel mode to the second one-way mode, the cage is arranged to be rotated, by the actuator, in the second circumferential direction.

17. A method of operating a switchable ratcheting clutch including an inner race forming a pocket, an outer race, a pawl including a portion disposed in the pocket, and a resilient element directly connected to a cage, the method comprising:

from a second one-way mode of the switchable ratcheting clutch, rotating, with an actuator and with respect to the inner race, the cage in a first circumferential direction around an axis of rotation around which the inner race or the outer race is supported for rotation;

sliding, in the first circumferential direction, the resilient element along a radially outwardly facing surface of the pawl;

tipping, with the resilient element, a first protrusion of the pawl radially inwardly and out of contact with the outer race;

tipping, with the resilient element, a second protrusion of the pawl radially outwardly and into contact with the outer race;

switching the switchable ratcheting clutch to a first one-way mode of the switchable ratcheting clutch;

rotating the inner race, relative to the outer race, in the first circumferential direction;

blocking, with the pawl, relative rotation of the inner race, with respect to the outer race, in a second circumferential direction, opposite the first circumferential direction;

rotating, with the actuator and with respect to the inner race, the cage in the second circumferential direction;

sliding, in the second circumferential direction, the resilient element along the radially outwardly facing surface of the pawl;

tipping, with the resilient element, the second protrusion of the pawl radially inwardly and out of contact with the outer race;

tipping, with the resilient element, the first protrusion of the pawl radially outwardly and into contact with the outer race;

switching the switchable ratcheting clutch to the second one-way mode;

rotating the inner race, relative to the outer race, in the second circumferential direction; and, blocking, with the pawl, relative rotation of the inner race, with respect to the outer race, in the first circumferential direction.

18. The method of claim 17, further comprising:

rotating, with the actuator and with respect to the inner race, the cage in the first circumferential direction;

tipping, with the resilient element, the first protrusion of the pawl out of contact with the outer race;

switching the switchable ratcheting clutch to a free-wheel mode; and, enabling rotation of the inner race, with respect to the outer race, in the first circumferential direction and in the second circumferential direction.

19. The method of claim 17, further comprising:

urging with the resilient element:

the first protrusion of the pawl radially inwardly with a first force; and, the second protrusion of the pawl radially inwardly with a second force, wherein:

switching the switchable ratcheting clutch from the second one-way mode of the switchable ratcheting clutch to the first one-way mode of the switchable ratcheting clutch includes increasing the first force; and, switching the switchable ratcheting clutch from the first one-way mode of the switchable ratcheting clutch to the second one-way mode of the switchable ratcheting clutch includes increasing the second force.

* * * * *